United States Patent
Peng et al.

(10) Patent No.: US 10,990,620 B2
(45) Date of Patent: Apr. 27, 2021

(54) AIDING COMPOSITION OF THEMED ARTICLES ABOUT POPULAR AND NOVEL TOPICS AND OFFERING USERS A NAVIGABLE EXPERIENCE OF ASSOCIATED CONTENT

(71) Applicant: Oath Inc., New York, NY (US)

(72) Inventors: John Peng, Arcadia, CA (US); Arun Autuchirayll, Burbank, CA (US); Eric Bax, Sierra Madre, CA (US)

(73) Assignee: Verizon Media Inc., New York, NY (US)

( * ) Notice: Subject to any disclaimer, the term of this patent is extended or adjusted under 35 U.S.C. 154(b) by 288 days.

(21) Appl. No.: 14/330,627

(22) Filed: Jul. 14, 2014

(65) Prior Publication Data

US 2016/0012130 A1 Jan. 14, 2016

(51) Int. Cl.
*G06F 16/338* (2019.01)
*G06F 16/335* (2019.01)

(52) U.S. Cl.
CPC .......... *G06F 16/338* (2019.01); *G06F 16/335* (2019.01)

(58) Field of Classification Search
CPC . G06F 17/30719; G06F 16/338; G06F 16/335
See application file for complete search history.

(56) References Cited

U.S. PATENT DOCUMENTS

| | | | | |
|---|---|---|---|---|
| 6,751,776 B1* | 6/2004 | Gong | ................ | G06F 17/30616 707/E17.028 |
| 7,366,711 B1* | 4/2008 | McKeown | ........ | G06F 17/30719 |
| 8,515,737 B2* | 8/2013 | Allen | .................... | G06F 17/248 704/1 |
| 2004/0267723 A1* | 12/2004 | Bharat | .................. | G06Q 30/02 |
| 2005/0131758 A1* | 6/2005 | Desikan | ............. | G06Q 30/0207 705/14.55 |
| 2006/0005113 A1* | 1/2006 | Baluja | ............... | G06F 17/30873 715/207 |
| 2006/0010162 A1* | 1/2006 | Stevens | ................ | G11B 27/034 |
| 2007/0214131 A1* | 9/2007 | Cucerzan | .......... | G06F 17/30864 |
| 2010/0082661 A1* | 4/2010 | Beaudreau | ........ | G06F 17/30867 707/769 |
| 2010/0138452 A1* | 6/2010 | Henkin | .................. | G06Q 30/02 707/803 |
| 2011/0314419 A1* | 12/2011 | Dunn | ................ | G06F 17/30905 715/810 |
| 2013/0054622 A1* | 2/2013 | Karmarkar | ........ | G06F 17/30032 707/749 |
| 2013/0173570 A1* | 7/2013 | Bennett | ............. | G06F 17/30867 707/706 |

(Continued)

OTHER PUBLICATIONS

BuzzFeed. Jul. 14, 2014. http://www.buzzfeed.com. 4 pp.

*Primary Examiner* — James Trujillo
*Assistant Examiner* — Kurt A Mueller
(74) *Attorney, Agent, or Firm* — Cooper Legal Group, LLC

(57) ABSTRACT

In one embodiment, a theme may be obtained. A search query may be executed to identify a plurality of search results pertaining to the theme. A plurality of topics pertaining to the theme may be identified from the search results. Search log data pertaining to the plurality of topics may be ascertained from a search log. The plurality of topics may be ranked based, at least in part, upon the search log data. At least a portion of the plurality of topics may be provided according to the ranking.

18 Claims, 11 Drawing Sheets

(56) References Cited

U.S. PATENT DOCUMENTS

2013/0325838 A1* 12/2013 Liao .................. G06F 17/30991
707/707
2014/0019441 A1* 1/2014 Shieh ................ G06F 17/30867
707/722
2014/0279257 A1* 9/2014 Fine .................. G06Q 30/0625
705/26.62

* cited by examiner

AIDING COMPOSITION OF THEMED ARTICLES ABOUT POPULAR AND NOVEL TOPICS AND OFFERING USERS A NAVIGABLE EXPERIENCE OF ASSOCIATED CONTENT

BACKGROUND OF THE INVENTION

The disclosed embodiments relate generally to computer-implemented methods and apparatus for aiding composition and navigation of articles.

As the internet has become ubiquitous, many times, a search engine is the first stop for a user attempting to find information on the internet about a particular subject. Search engines are provided by a number of entities and search capabilities are embedded in many web sites. For instance, many web sites provide search applications that enable users to search the content of the web sites, as well as web sites across the Internet.

Typically, a search engine returns a list of search results in response to a search query. The search engine may also generate revenue from advertisements provided with or as part of the search results. A search result may include a document, which may be identified by a Uniform Resource Locator (URL).

In some instances, a single document may include a list of items. For example, such a list may include the top ten vacation spots in California. However, such lists are typically manually generated based upon individual opinions. As a result, such lists are often time-consuming and tedious to generate.

SUMMARY OF THE INVENTION

In one embodiment, a theme may be obtained. A search query may be executed to identify a plurality of search results pertaining to the theme. A plurality of topics pertaining to the theme may be identified from the search results. Search log data pertaining to the plurality of topics may be ascertained from a search log. The plurality of topics may be ranked based, at least in part, upon the search log data. At least a portion of the plurality of topics may be provided according to the ranking.

In another embodiment, the invention pertains to a device comprising a processor, memory, and a display. The processor and memory are configured to perform one or more of the above described method operations. In another embodiment, the invention pertains to a computer readable storage medium having computer program instructions stored thereon that are arranged to perform one or more of the above described method operations.

These and other features and advantages of the present invention will be presented in more detail in the following specification of the invention and the accompanying figures which illustrate by way of example the principles of the invention.

DETAILED DESCRIPTION OF THE SPECIFIC EMBODIMENTS

Figure 1:
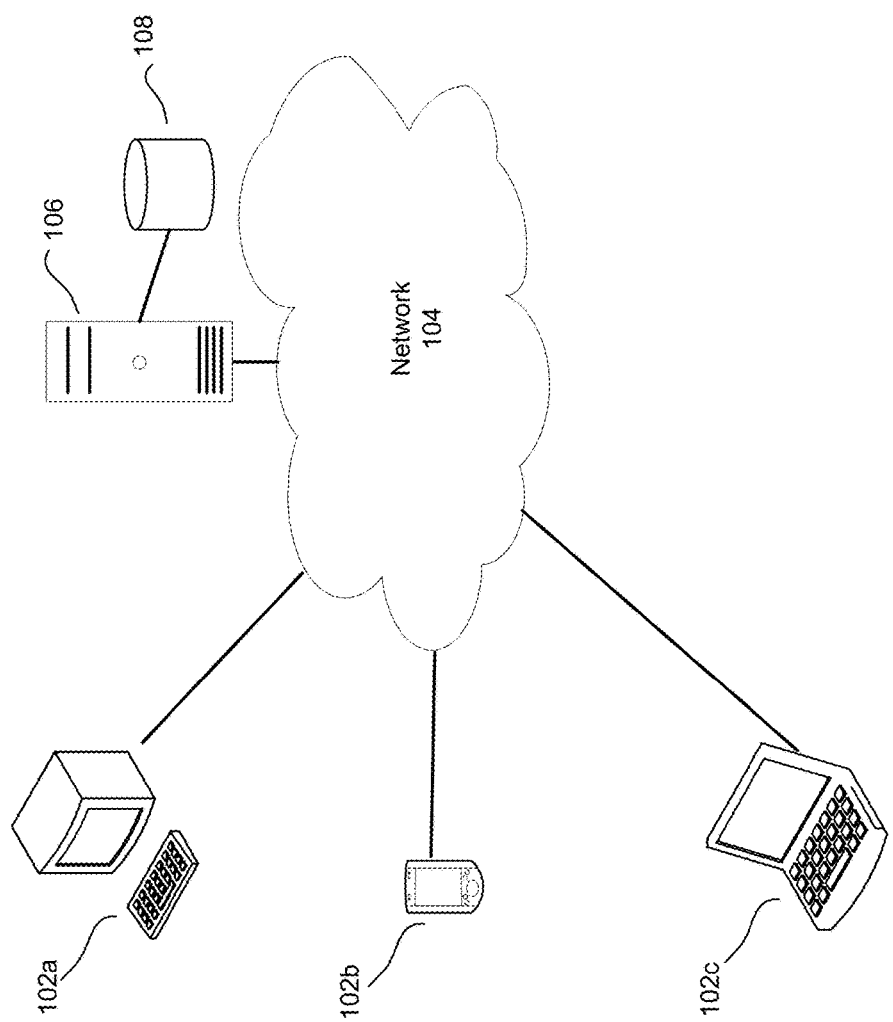
FIG. 1 is a diagram illustrating an example system in which embodiments of the invention may be implemented.

Reference will now be made in detail to specific embodiments of the disclosure. Examples of these embodiments are illustrated in the accompanying drawings. While the disclosure will be described in conjunction with these specific embodiments, it will be understood that it is not intended to limit the disclosure to these embodiments. On the contrary, it is intended to cover alternatives, modifications, and equivalents as may be included within the spirit and scope of the disclosure as defined by the appended claims. In the following description, numerous specific details are set forth in order to provide a thorough understanding of the disclosure. The disclosed embodiments may be practiced without some or all of these specific details. In other instances, well known process operations have not been described in detail in order not to unnecessarily obscure the disclosure. The Detailed Description is not intended as an extensive or detailed discussion of known concepts, and as such, details that are known generally to those of ordinary skill in the relevant art may have been omitted or may be handled in summary fashion Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

In recent years, the Internet has been a main source of information for millions of users. These users rely on the Internet to search for information of interest to them. One conventional way for users to search for information is to initiate a search query through a search service's web page. Typically, a user can enter a query including one or more search term(s) into an input box on the search web page and then initiate a search based on such entered search term(s). In response to the query, the search service typically returns an ordered list of search result documents.

A Uniform Resource Locator (URL) may identify a location at which a document is located. The document may be located on a particular web site, as well as a specific web page on the web site. For instance, a first URL may identify a location of a web page at which a document is located, while a second URL may identify a location of a web site at which the document can be located.

In accordance with various embodiments, composition of a document including a themed article may be facilitated. This is accomplished, in part, through the automated generation of an outline including a list of topics that may be addressed in the themed article. Accordingly, the outline may serve as a skeleton for use in composing a themed article.

Once generated, a themed article may be navigated by a user. Various methods and graphical user interfaces for facilitating such navigation will be described in further detail below.

Example System

FIG. 1 is a diagram illustrating an example system in which embodiments of the invention may be implemented. As shown in FIG. 1, the system may include one or more servers 106 associated with a web site such as a social networking web site. Examples of web sites that may implement the disclosed embodiments include Yahoo, Facebook, Tumblr, LinkedIn, Flickr, and Meme. The server(s) 106 may enable the web site to provide a variety of services to its users. More particularly, users of the web site may communicate with other individuals via a medium such as electronic mail. In addition, users of the web site may access other services such as maintain public user profiles, upload files (e.g., photographs, videos), etc.

The server(s) 106 may include an electronic mail server that enables electronic mail messages to be routed between individuals. A plurality of clients 102a, 102b, 102c may access an electronic mail application to generate, transmit, or receive electronic mail messages from other individuals. An electronic mail application may be installed on the server(s) 106 and/or the clients 102a, 102b, 102c.

In addition, the server(s) 106 may include a search server and a web server. As shown, the plurality of clients 102a, 102b, 102c may access a search application (i.e., search service), for example, on the search server via network 104 and/or access a web service, for example, on the web server. The search application may be implemented via a search engine on any number of servers although a single server 106 is illustrated for clarity. In some embodiments, the search application may be installed and executed on the client device.

A search application generally allows a user (human or automated entity) to search for information that is related to a search query including one or more search terms. The search terms may be entered by a user in any manner. For example, a graphical user interface may present an input feature to the client (so the user can enter a query including one or more search term(s)). More particularly, the graphical user interface may present an input box (i.e., search query section) into which a user may type a query including any number of search terms or portion thereof. In some embodiments, suggested search queries (i.e., search suggestions) may be provided. The user may then select one of the suggested search queries to submit to the search application via the graphical user interface.

The search query may then be executed via a search application with respect to one or more data sources. The data sources may include local data sources (e.g., on the client) and/or data sources that are remotely located via the network 104. In response to the search query, the search application may identify and present information, which may include documents that are most relevant to the user's search query.

Search engines typically provide pages of search results in response to search queries. The search results may include excerpts or summaries of web pages, written by different authors and with no unifying introduction or conclusion. Some search engines also publish information about which queries are popular or are becoming popular. This information is usually in the form of a list of queries, without any further information pertaining to the queries.

In accordance with various embodiments, the server(s) 106 may aid in the composition of a themed article, as will be described in further detail below. More particularly, the server(s) 106 may automatically generate a list of a number of keywords that may serve as topics for use in composing an article of a given theme. Once generated, the list may include multiple topics. Accordingly, an outline for aiding the composition of a themed article may include the list of topics.

In accordance with various embodiments, the server(s) 106 may include a topic generation module that is configured to execute a search query to identify a plurality of search results pertaining to a theme and identify a plurality of topics pertaining to the theme from the search results. The server(s) 106 may further include an outline generation module that is configured to ascertain, from a search log, search log data pertaining to the plurality of topics, rank the plurality of topics based, at least in part, upon the search log data, and provide at least a portion of the plurality of topics according to the ranking such that an outline for aiding composition of a themed article is presented.

The outline may also include further information that may be useful in composing the themed article. More particularly, the outline may include sub-topics and/or search insights such as search statistics that may be useful in composing the themed article. For example, the search insights may include a ranking of the topics. As another example, the search insights may provide further details behind the ranking of the topics. Various embodiments for generating the list of topics and further information will be described in further detail below.

The outline including the list of topics may be used to compose a themed article. The themed article may then be presented for display via a graphical user interface.

The server(s) 106 may provide an outline including the list of topics, the themed article, and/or hypertext link(s) via the web site (e.g., via display on a web page of the web site), via electronic mail, Short Message Service (SMS), via a mobile device (e.g., text message), or via another medium such as digital television, which may be connected to the Internet.

The themed article that is presented via a graphical user interface may include one or more hypertext links. For example, the themed article may include a plurality of hypertext links, where each hypertext link corresponds to a different one of the topics discussed in the themed article. If a user viewing the themed article wishes to view further information pertaining to a given topic, the user may click on one of the hypertext links. In response to the selection of the hypertext link, a search results page providing information regarding the topic may be presented for display to the user.

The search results page may include a plurality of search results. In addition, the search results page may include one or more advertisements. In some embodiments, the search results page may also include a segment (e.g., box) including hypertext links corresponding to at least a portion of the topics discussed in the themed article, enabling the user to continue to do further research on topics addressed in the themed article by selecting from the hypertext links presented in the segment of the search results page. The segment may "follow" the user as the user selects from the hypertext links associated with the topics until the user submits a new search query via the search application.

The network 104 may take any suitable form, such as a wide area network or Internet and/or one or more local area networks (LAN's). The network 104 may include any suitable number and type of devices, e.g., routers and switches, for forwarding search or web object requests from each client to the search or web application and search or web results back to the requesting clients.

The invention may also be practiced in a wide variety of network environments (represented by network 104) including, for example, TCP/IP-based networks, telecommunications networks, wireless networks, etc. In addition, the computer program instructions with which embodiments of the invention may be implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

Embodiments disclosed herein may be implemented via the server(s) 106 and/or the clients 102a, 102b, 102c. For example, various features may be implemented via a web browser and/or application on the clients 102a, 102b, and 102c. The disclosed embodiments may be implemented via software and/or hardware.

The search server 106 (or servers) may have access to one or more search logs into which search information is retained. For example, the search logs may be retained in one or more memories 108 that are coupled to the server(s) 106. Each time a user performs a search on one or more search terms, information regarding such search may be retained in the search logs. For instance, the user's search request may contain any number of parameters, such as user or browser identity and the search terms, which may be retained in the search logs. Additional information related to the search, such as a timestamp, may also be retained in the search logs along with the search request parameters. When results are presented to the user based on the entered search terms, parameters from such search results may also be retained in the search logs. For example, an identity of the specific search results (e.g., URLs), such as the web sites, the order in which the search results are presented, whether each search result is a sponsored or algorithmic search result, the owner (e.g., web site) of each search result, and/or whether each search result is selected (i.e., clicked on) by the user (if any), may be retained in the search logs. In addition, further information such as revenue generated in association with a search result (e.g., advertisement) may be maintained or ascertained.

In addition, the memories 108 may store one or more user logs (e.g., user databases) that retain user information. This user information or a portion thereof may be referred to as a user profile. More particularly, the user profile may include public information that is available in a public profile and/or private information. Furthermore, the user profile may include information that has been submitted by the user and/or information that has been deduced or automatically collected by the system (e.g., based upon user action(s)). The user information retained in the user logs may include personal information such as demographic information (e.g., age and/or gender) and/or geographic information (e.g., Global Positioning System (GPS) location, Internet Protocol (IP) address, country region/state, city, and/or zip code), which may include or indicate the user's residence address, work address, and/or current location. In addition, the user information may indicate interests of the user, products or services purchased by the user, properties (e.g., categories) of information that the user commonly accesses on the Internet, and/or a profession of the user. A user may be identified in the user logs by a user ID (e.g., user account ID), information in a user cookie, etc. The user logs may be retained in one or more memories.

A variety of mechanisms may be implemented to generate a profile including, but not limited to, collecting or mining navigation history, stored documents, tags, or annotations, to provide a few examples. A profile builder may store a generated profile. Profiles of users of a search engine, for example, may give a search engine provider a mechanism to retrieve annotations, tags, stored pages, navigation history, or the like, which may be useful for making relevance determinations of search results, such as with respect to a particular user.

Figures 2A, 2B:
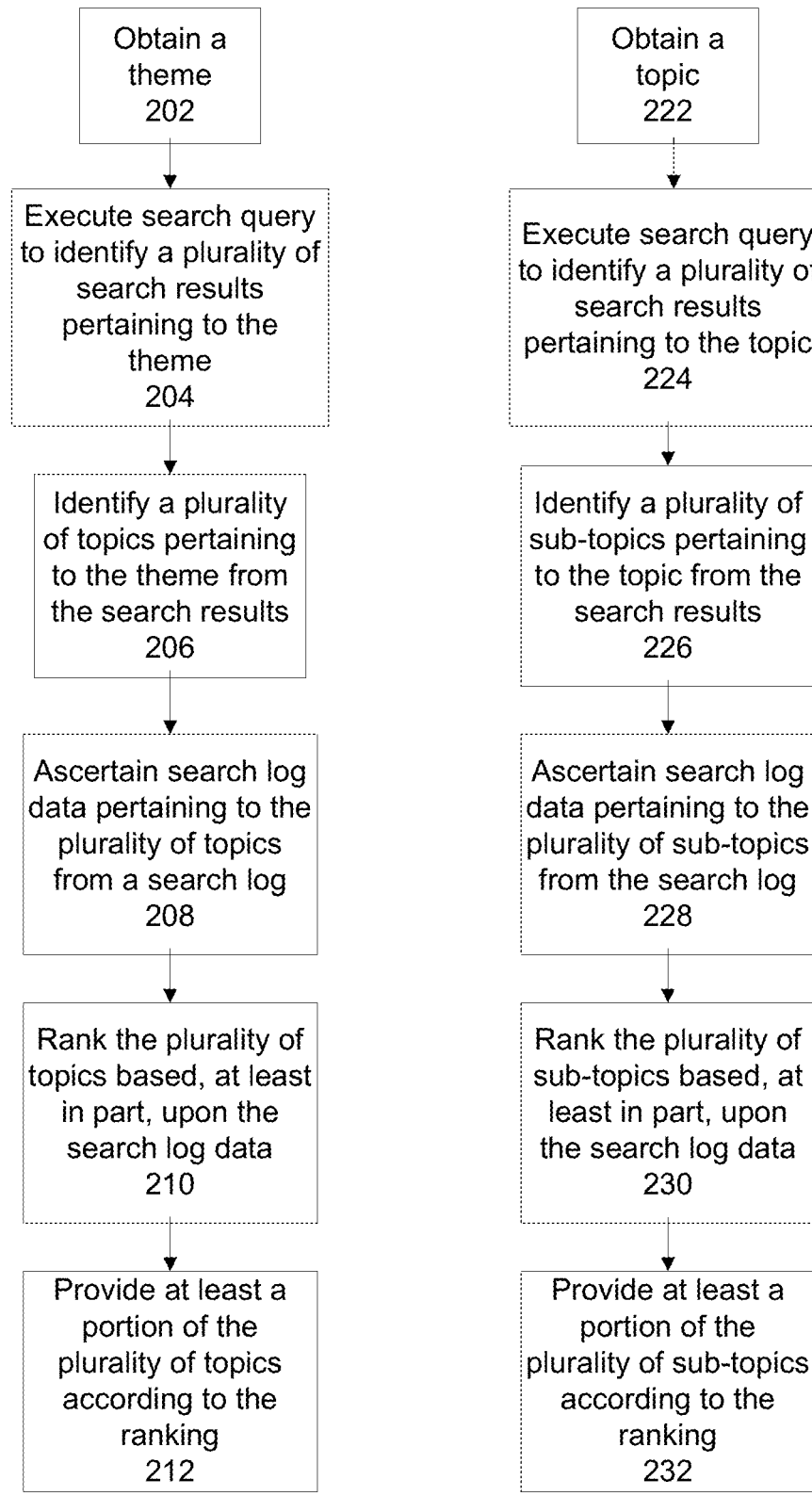
FIG. 2A is a process flow diagram illustrating an example method of aiding composition of an article in accordance with various embodiments.
FIG. 2B is a process flow diagram illustrating an example method of identifying sub-topics for use in aiding composition of an article in accordance with various embodiments.

FIG. 2A is a process flow diagram illustrating an example method of aiding composition of an article in accordance with various embodiments. As shown at 202, a theme may be obtained. For example, the theme may be "top Mother's Day gifts." In some embodiments, a graphical user interface may be presented, enabling a user to submit a theme for which a themed article is to be composed. Thus, the theme may be obtained upon receipt of the theme via the graphical user interface. In other embodiments, the theme may be submitted via a file or other suitable mechanism.

A search query may be executed to identify a plurality of search results pertaining to the theme at 204. In some embodiments, the theme may be submitted as a search query via a search application, which may return the plurality of search results. In this example, the theme "top Mother's Day gifts" may be submitted as the search query. In other embodiments, the search query that is submitted via the search application may be composed based upon terms in the theme. In other words, the search query that is submitted need not be identical to the theme. Thus, the search query may include modifications to the theme, contain fewer terms than the theme, or contain additional terms that were not originally included in the theme.

A plurality of topics pertaining to the theme may be identified from the search results at 206. More particularly, at least a portion of the plurality of search results may be parsed to obtain a plurality of tokens, where each token in the plurality of tokens is present in at least one of the plurality of search results. For example, at least a portion of each of the plurality of search results may be parsed to obtain the plurality of tokens. Each one of the plurality of tokens may be associated with one of the plurality of topics. For example, the tokens "smartphone" and "cell phone" may be associated with the topic "smartphone." In some embodiments, each one of the plurality of tokens may represent a different one of the plurality of topics.

The parsing of a given search result or portion thereof may generate a subset of the plurality of tokens. Thus, each of the plurality of search results may be parsed to generate the plurality of tokens. In some embodiments, the parsing of a given search result may be performed dynamically after the plurality of search results have been identified. In other embodiments, parsing of documents may be performed offline and tokens for each parsed document may be saved for subsequent retrieval. As a result, a lookup for tokens may be performed for each of the plurality of search results. In the event that tokens have not previously been saved for a given search result, the search result may be parsed, as discussed above.

Search log data pertaining to the plurality of topics may be ascertained from a search log at 208. More particularly, the search log data may pertain to the plurality of topics, which were submitted as queries via a search application, during a particular period of time. For example, where the theme pertains to Mother's Day, the period of time may be several weeks prior to Mother's Day. Thus, in some embodiments, a pertinent period of time that pertains to the theme may be ascertained, enabling the most pertinent search log data to be retrieved.

The search log data may be further filtered based upon additional criteria. For example, it may be desirable to identify "top Mother's Day gifts for people living in California." Thus, the search log data may be further filtered to reflect search behavior of a group of individuals having specific characteristics. Such characteristics may include demographics such as city, state, zip code, age, gender, and/or profession. Moreover, the search log data may also be filtered based upon other criteria, such as interests or purchase history of the group of individuals.

The search log data for each topic in the plurality of topics may indicate a number of times or frequency that the topic has been searched via a search engine during the particular period of time, a change in the number of times or frequency that the topic has been searched via the search engine during the particular period of time relative to a previous period of time, a number of times or frequency that search results that have been provided for the topic have been clicked, a change in the number of times or frequency that the search results that have been provided for the topic have been clicked relative to a previous period of time, a number of advertisements presented in association with the topic, and/or revenue generated from advertisements presented in association with the topic.

The plurality of topics may be ranked at 210 based, at least in part, upon the search log data. More particularly, the search log data may be analyzed to determine various search log statistics pertaining to each of the plurality of topics, and the plurality of topics may be ranked based, at least in part, upon these statistics. As discussed above, such statistics may include a number of times or frequency that a given topic has been searched via a search engine during the particular period of time, a change in the number of times or frequency that the topic has been searched via the search engine during the particular period of time relative to a previous period of time, a number of times or frequency that search results that have been provided for the topic have been clicked, a change in the number of times or frequency that the search results that have been provided for the topic have been clicked relative to a previous period of time, a number of advertisements presented in association with the topic, and/or revenue generated from advertisements presented in association with the topic. Thus, the plurality of topics may be ranked to identify topics that are popular, novel, non-obvious, and/or highly monetizable. In this manner, a statistical filter may be applied to rank the plurality of topics.

At least a portion of the plurality of topics may be provided at 212 according to the ranking for use in composing an article pertaining to the theme. More particularly, a particular number of the plurality of topics may be provided for use in aiding composition of an article. For example, where the plurality of topics includes 100 topics, 20 topics may be provided for use in aiding composition of the article. The number of items may be a pre-defined number or may be established dynamically via a suitable algorithm. The topics may be provided via a graphical user interface, electronic mail, an output file, or other suitable mechanism. In this manner, a list of topics associated with a particular theme may be identified and provided in response to submission of the theme.

In addition, further information such as search insights that may be useful for composing an article may be provided. More particularly, at least a portion of the search log data or statistics generated therefrom may be provided in conjunction with the at least a portion of the plurality of topics. For example, such further information may include or indicate a number of times or frequency that a given topic has been searched via a search engine during the particular period of time, a change in the number of times or frequency that the topic has been searched via the search engine during the particular period of time relative to a previous period of time, a number of times or frequency that search results that have been provided for the topic have been clicked, a change in the number of times or frequency that the search results that have been provided for the topic have been clicked relative to a previous period of time, a number of advertisements presented in association with the topic, and/or revenue generated from advertisements presented in association with the topic.

In some embodiments, at least a subset of the topics that have been provided may be clustered, enabling the subset of the topics to be unified as sub-topics of a unified topic. For example, an algorithm such as a k-means algorithm or term-frequency, inverse document frequency (TFIDF) may be applied to the plurality of search results to determine text similarity of the plurality of search results. Those topics in search results that are determined to be textually similar may be clustered accordingly.

In addition, further terms may also be provided for incorporation into a themed article. Such further terms may be obtained, for example, from the search results or further search results. For example, it is possible to identify terms such as sub-topics associated with a particular topic.

FIG. 2B is a process flow diagram illustrating an example method of identifying sub-topics for use in aiding composition of an article in accordance with various embodiments. As shown at 222, one of the topics that have been provided for use in composing an article may be obtained (e.g., identified). For example, the topic may be "gadgets." In some embodiments, identification of sub-topics for a topic may be automatic. In other embodiments, a graphical user interface may be presented, enabling a user to submit a topic for which sub-topics are to be identified. Thus, the topic may be obtained automatically or upon receipt via the graphical user interface.

A search query may be executed to identify a plurality of search results pertaining to the topic at 224. In some embodiments, the topic may be submitted as a search query via a search application, which may return the plurality of search results pertaining to the topic. In this example, the topic "gadgets" may be submitted as the search query. In other embodiments, the search query that is submitted via the search application may be composed based upon terms in the topic. In other words, the search query that is submitted need not be identical to the topic. Thus, the search query may include modifications to the topic, contain fewer terms than the topic, or contain additional terms that were not originally included in the topic.

A plurality of sub-topics pertaining to the topic may be identified from the search results pertaining to the topic at 226. As described above, at least a portion of the plurality of search results may be parsed to obtain a plurality of tokens, where each token in the plurality of tokens is present in at least one of the plurality of search results. For example, at least a portion of each of the plurality of search results may be parsed to obtain the plurality of tokens. Each one of the plurality of tokens may be associated with one of the plurality of sub-topics. In some embodiments, each one of the plurality of tokens may represent a different one of the plurality of sub-topics.

Search log data pertaining to the plurality of sub-topics may be ascertained from a search log at 228. More particularly, the search log data may pertain to the plurality of sub-topics, which were submitted as queries via a search application, during a particular period of time. For example, where the theme pertains to Mother's Day, the period of time may be several weeks prior to Mother's Day. Thus, in some embodiments, a pertinent period of time that pertains to the theme of the article may be ascertained, enabling the most pertinent search log data to be retrieved.

The search log data may be further filtered based upon additional criteria. For example, the theme of the article may be "top Mother's Day gifts for people living in California." Thus, the search log data may be further filtered to reflect search behavior of a group of individuals having specific characteristics. Such characteristics may include demographics such as city, state, zip code, age, gender, profession, and/or race. Moreover, the search log data may also be filtered based upon other criteria, such as interests or purchase history of the group of individuals.

The search log data for each sub-topic in the plurality of sub-topics may indicate a number of times or frequency that the sub-topic has been searched via a search engine during the particular period of time, a change in the number of times or frequency that the sub-topic has been searched via the search engine during the particular period of time relative to a previous period of time, a number of times or frequency that search results that have been provided for the sub-topic have been clicked, a change in the number of times or frequency that the search results that have been provided for the sub-topic have been clicked relative to a previous period of time, a number of advertisements presented in association with the sub-topic, and/or revenue generated from advertisements presented in association with the sub-topic.

The plurality of sub-topics may be ranked at 230 based, at least in part, upon the search log data. More particularly, the search log data may be analyzed to determine various search log statistics pertaining to each of the plurality of sub-topics, and the plurality of sub-topics may be ranked based, at least in part, upon these statistics. As discussed above, such statistics may include a number of times or frequency that a given sub-topic has been searched via a search engine during the particular period of time, a change in the number of times or frequency that the sub-topic has been searched via the search engine during the particular period of time relative to a previous period of time, a number of times or frequency that search results that have been provided for the sub-topic have been clicked, a change in the number of times or frequency that the search results that have been provided for the sub-topic have been clicked relative to a previous period of time, a number of advertisements presented in association with the sub-topic, and/or revenue generated from advertisements presented in association with the sub-topic. Thus, the plurality of sub-topics may be ranked to identify sub-topics that are popular, non-obvious, and/or highly monetizable. In this manner, a statistical filter may be applied to rank the plurality of sub-topics.

At least a portion of the plurality of sub-topics may be provided at 232 according to the ranking More particularly, a particular number of the plurality of sub-topics may be provided for use in aiding composition of an article. The number of items may be a pre-defined number or may be established dynamically via a suitable algorithm. The sub-topics may be provided via a graphical user interface, electronic mail, an output file, or other suitable mechanism. In this manner, a list of sub-topics associated with a particular topic may be identified and provided for use in composing an article.

In addition, further information such as search insights that may be useful for composing the article may be provided. More particularly, at least a portion of the search log data or statistics generated therefrom may be provided in conjunction with the at least a portion of the plurality of sub-topics. For example, such further information may include or indicate a number of times or frequency that a given sub-topic has been searched via a search engine during the particular period of time, a change in the number of times or frequency that the sub-topic has been searched via the search engine during the particular period of time relative to a previous period of time, a number of times or frequency that search results that have been provided for the sub-topic have been clicked, a change in the number of times or frequency that the search results that have been provided for the sub-topic have been clicked relative to a previous period of time, a number of advertisements presented in association with the sub-topic, and/or revenue generated from advertisements presented in association with the sub-topic.

A themed article may be composed based, at least in part, upon an outline including the at least a portion of the plurality of topics that have been provided. In addition, the themed article may be composed based, at least in part, upon any further information, including sub-topics, search insights associated with any of the topics, and/or search insights associated with any of the sub-topics. In this manner, an outline including a list of topics, sub-topics, and/or search insights may be generated for use in composing a themed article. Therefore, the outline that is provided for use in aiding composition of a themed article may include topics, as well as further information such as sub-topics and/or search insights.

Once composed, the article may be provided for viewing by a user. In some embodiments, the article may be provided by providing a URL or hypertext link. In other embodiments, the article may be presented for display via a graphical user interface, as will be described in further detail below.

Figure 3A:
FIG. 3A is a diagram illustrating a graphical user interface featuring an example article that has been composed in accordance with various embodiments.

FIG. 3A is a diagram illustrating a graphical user interface featuring an example article 302 that has been composed in accordance with various embodiments. In this example, the article 302 is entitled, "Top Mother's Day Gifts." The article 302 may be featured on a portion of web page. For example, the article 302 may be featured in a "Today Module" of the web page.

The article 302 may be featured several weeks prior to Mother's Day. For example, the article 302 may be featured on April 29-30. To generate a list of topics for the article 302, search log data may be retrieved from the search log for a period of a week occurring two weeks prior to Mother's Day.

Figure 3B:
FIG. 3B is a diagram illustrating an example graphical user interface displaying the article of FIG. 3A.

FIG. 3B is a diagram illustrating an example graphical user interface displaying the article of FIG. 3A. Upon clicking and selecting the article 302 shown in the Today Module of FIG. 3A, the article 302 entitled, "Top Mother's Day Gifts" may be presented, as shown. The article 302 may be generated by one or more individuals, who may add an editorial voice 304 to the article 302.

As shown in this example, a list of topics including flowers and edible arrangements has been generated and used to compose the article 302 pertaining to the theme "Top Mother's Day Gifts." The article 302 may include a plurality of segments, where each of the plurality of segments is dedicated to one or more topics in the list of topics. In this example, a first segment 306 of the article 302 corresponds to the topic, "flowers," and a second segment 308 of the article 302 corresponds to the topic, "edible arrangements." Thus, each of the plurality of segments may include a discussion of a different subset of topics in the list of topics. Each of the plurality of segments may be identified by a representation of the corresponding topic(s) in the list of topics. Such a representation of a corresponding topic may include a label, image, and/or other identifier. In addition, each of the plurality of segments may be numbered, as shown in this example. Each segment may include one or more sections (e.g., paragraphs).

To enable a user to explore the topics discussed in the article in further detail, the article 302 may include one or more hypertext links associated with one or more of the topics discussed in the article. More particularly, each of the plurality of segments in the article may include zero or more hypertext links. Stated another way, each of the topics discussed in an article may or may not have associated therewith one or more selectable hypertext links. In this example, the article includes a hypertext link 310 corresponding to the topic "Mother's Day Flowers," which is presented in a segment of the article pertaining to the topic "Flowers." A user may click on the hypertext link 310 to obtain a search results page pertaining to "Mother's Day Flowers."

In addition, search log data or statistics derived from the search log data may also be incorporated into the article. For example, search insights 312, such as the fact that searches on edible arrangements surged 262 percent during the two weeks leading up to Mother's Day, may be incorporated into the article.

Figure 3C:
FIG. 3C is a diagram illustrating a graphical user interface featuring another example article that has been composed in accordance with various embodiments.

FIG. 3C is a diagram illustrating a graphical user interface featuring another example article 320 that has been composed in accordance with various embodiments. In this example, the article 320 is entitled, "List Minute Gift Ideas for Mother's Day." The article 320 may be featured on a portion of a web page such as a "Today Module."

The article 320 may be featured several days prior to Mother's Day. For example, the article 320 may be featured on May 8-9. To generate a list of topics that are pertinent to the article 320, search log data may be retrieved from the search log for a period of two weeks prior to Mother's Day.

Figure 3D:
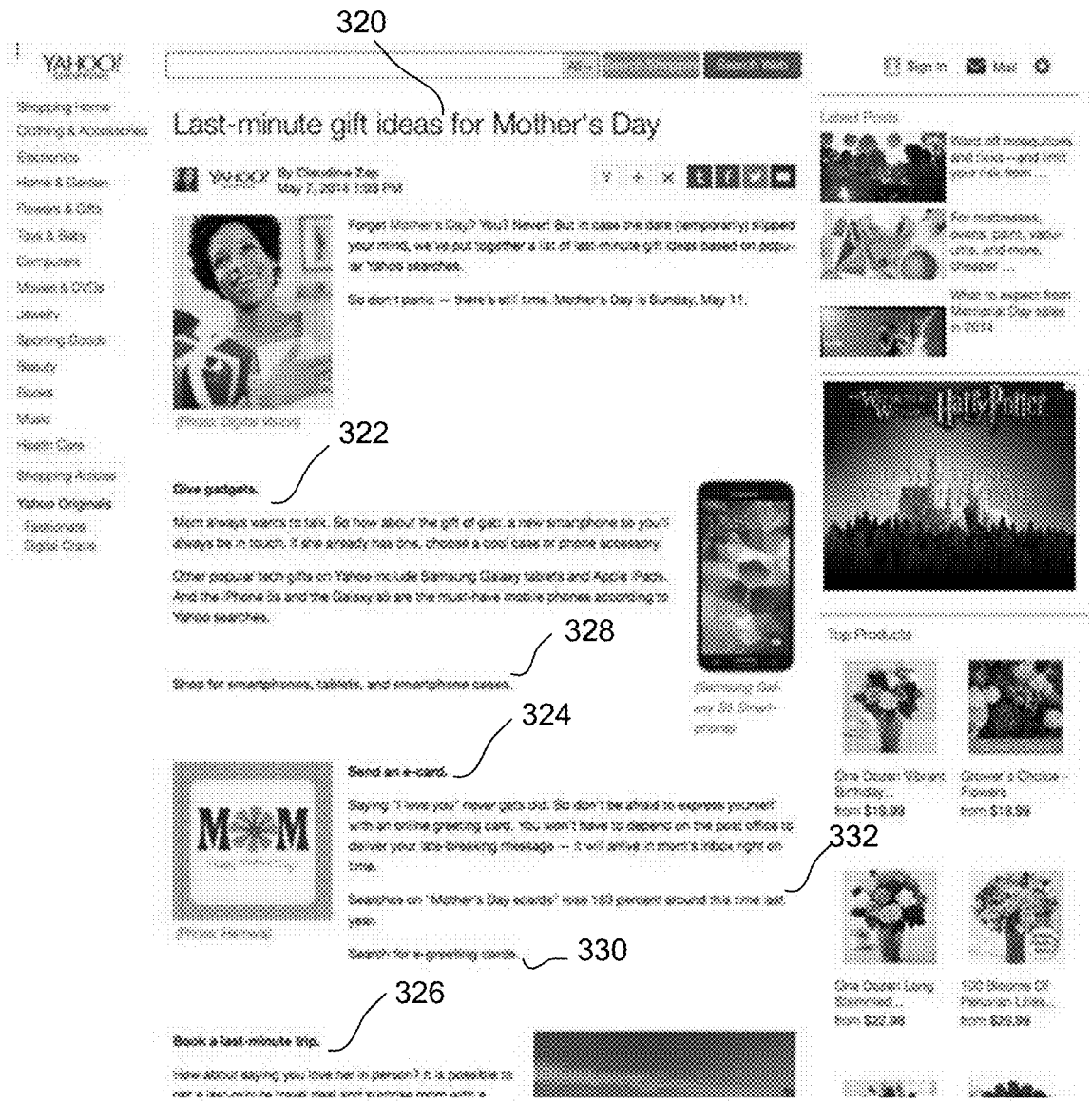
FIG. 3D is a diagram illustrating an example graphical user interface displaying the article of FIG. 3C.

FIG. 3D is a diagram illustrating an example graphical user interface displaying the article of FIG. 3C. Upon clicking and selecting the article 320 shown in the Today Module of FIG. 3C, the article 302 entitled, "Last Minute Gift Ideas for Mother's Day" may be presented, as shown. As shown in this example, an outline including a list of topics including gadgets, e-cards, and list-minute trips has been generated and used to compose the article 320 pertaining to the theme "Last-Minute Gift Ideas for Mother's Day." The article 320 may include a plurality of segments, where each of the plurality of segments is dedicated to one or more topics in the list of topics. In this example, a first segment 322 corresponds to the topic, "give gadgets," a second segment 324 corresponds to the topic, "send an e-card," and a third segment 326 corresponds to the topic, "book a last-minute trip." Thus, each of the plurality of segments may include a discussion pertaining to a different subset of an outline or a different subset of topics in a list of topics.

The article 320 may include one or more hypertext links associated with one or more of the topics discussed in the article. In this example, the first segment 322 of the article pertaining to the topic "give gadgets" includes three hypertext links 328 corresponding to the topic "give gadgets." More particularly, the three hypertext links pertain to smartphones, tablets, and smartphone cases, respectively. Thus, in this example, hypertext links may pertain to sub-topics of a corresponding topic. The second segment 324 of the article pertaining to the topic "send an e-card" includes a fourth hypertext link 330 pertaining to e-greeting cards. A user may click on any of the hypertext links in the article 320 to obtain a search results page presenting search results pertaining to the associated hypertext link, topic, or sub-topic.

In addition, search log data or statistics derived from that search log data may also be incorporated into the article. For example, search insights 332, such as the fact that searches on Mother's Day ecards rose 163 percent around this time last year, may be incorporated into the article 320.

Figure 3E:
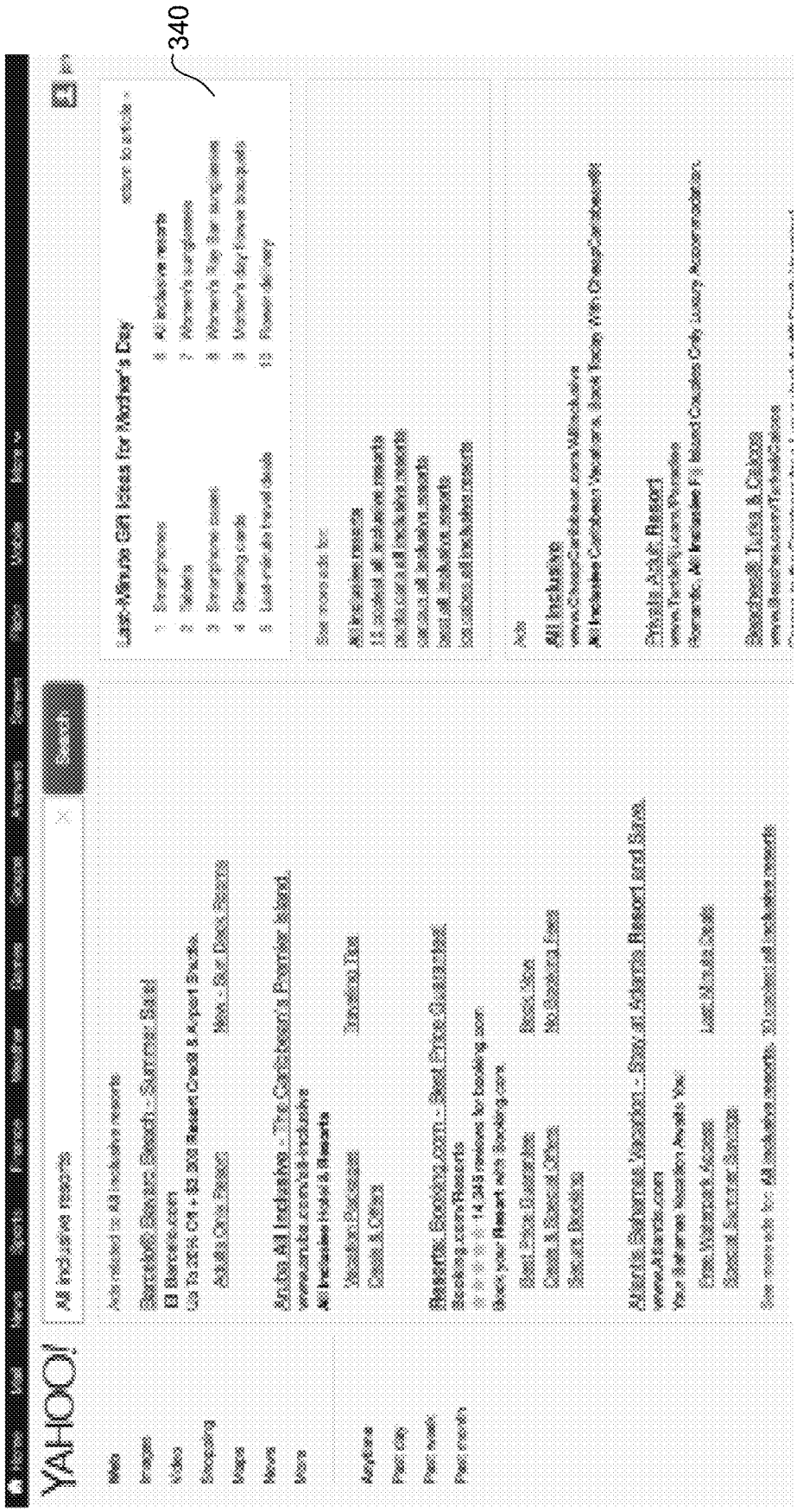
FIG. 3E is a diagram illustrating a graphical user interface displaying an example search results page that may be presented in accordance with various embodiments.

FIG. 3E is a diagram illustrating a graphical user interface displaying an example search results page that may be presented in accordance with various embodiments. When a user selects one of the links in the article 320, a search results page pertaining to the corresponding topic or sub-topic may be presented, as shown in FIG. 3E. In this example, when the user clicks on the link pertaining to the topic "last-minute trips," a search results page including search results pertaining to last-minute trips may be presented.

In addition, the search results page may include a segment 340 including a set of links. In this example, the segment 340 is presented in the form of a box in the upper right-hand corner of the graphical user interface. Each one of the set of links in the segment may be associated with a corresponding one of the topics discussed in the article 320. For example, each one of the set of links may be associated with a different one of the topics or sub-topics discussed in the article 320. In accordance with various embodiments, the segment 340 may include each of the links presented in the article 320.

In response to a selection of one of the set of links in the segment 340, a subsequent search results page pertaining to the corresponding topic may be presented. The subsequent search results page may also include the segment 340 (e.g., box) shown in the original search results page. As a result, the topics discussed in an article may be displayed to a user reading the article even after they leave the page on which the article is presented. Thus, this segment 340 may be "recirculated" each time the user clicks on a link within the article 320 or a link within the segment 340 (e.g., until the user submits a new search query). Accordingly, the disclosed embodiments may provide a guided experience that facilitates the research of topics discussed in an article in further depth with minimal effort by a user.

The user may click on any of the set of links presented in the segment 340 of a search results page to obtain further information pertaining to the corresponding topic or sub-topic. More particularly, a search query pertaining to the topic or sub-topic may be executed by the search application automatically upon selection of a particular one of the set of links.

Figure 4:
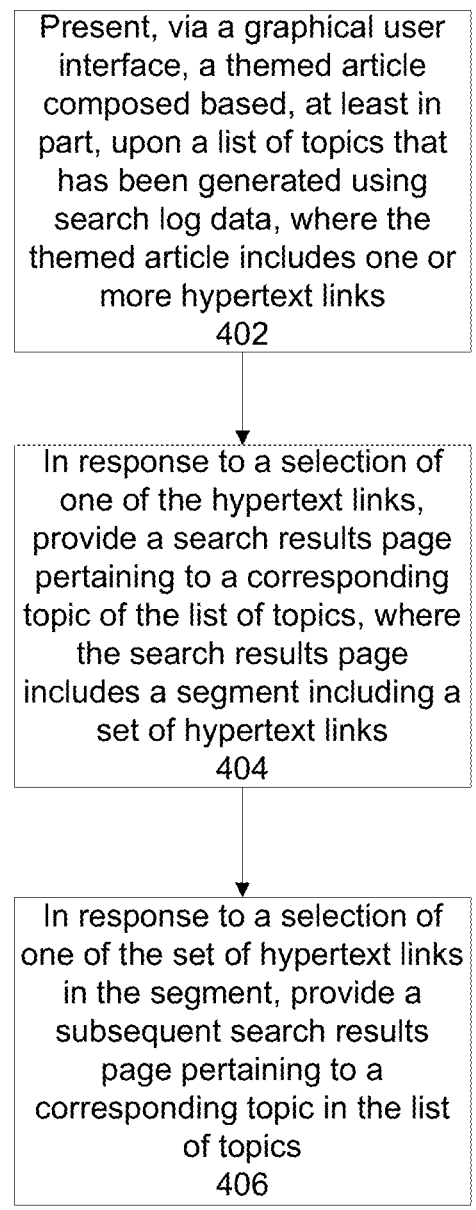
FIG. 4 is a process flow diagram illustrating an example method of presenting an article via a graphical user interface in accordance with various embodiments.

FIG. 4 is a process flow diagram illustrating an example method of presenting an article via a graphical user interface in accordance with various embodiments. A display module may be configured to provide an article generated according to the disclosed embodiments. More particularly, a themed article composed based, at least in part, upon a list of topics that has been generated using search log data may be presented via a graphical user interface at 402. For example, the article that is presented may include a plurality of segments, where each of the plurality of segments is dedicated to one or more topics in the list of topics. Each segment may include one or more separate sections (e.g., paragraphs).

The article may include one or more hypertext links associated with the list of topics. More particularly, each of the plurality of segments may or may not include one or more hypertext links associated with the corresponding topic. For example, a segment may include a single hypertext link that specifically identifies the corresponding topic (e.g., gadgets). As another example, a segment may include multiple hypertext links that identify multiple topics or sub-topics of a corresponding topic (e.g., smartphones, tablets, smartphone cases).

In response to a selection of one of the hypertext links, a search results page pertaining to a corresponding topic of the list of topics may be provided at 404. As described above, in some instances, the search results page may pertain to a sub-topic of the corresponding topic. The search results page may include a segment including a set of links, where each link in the set of links is associated with a corresponding one of the list of topics. In some instances, a link in the set of links may pertain to a sub-topic of a particular topic. In accordance with various embodiments, when one of the links in a themed article is selected, an indicator may be set via an application programming interface (API) to notify the search application that the segment including the set of links is to be presented within the search results page.

In response to a selection of one of the set of links in the segment at 406, a subsequent search results page pertaining to the corresponding topic (or an associated sub-topic) in the list of topics may be provided. The subsequent search results may include the segment presented in the prior search results page. More particularly, when one of the set of links in the segment of the themed article is selected, an indicator may be set to notify the search application that the segment including the set of links is to be presented within the search results page. Thus, the segment may be "recirculated" such that it is presented in each search results page originating from a link in the themed article or from a link in the segment of a search results page.

Network

A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

Content Distribution Network

A distributed system may include a content distribution network. A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, "cloud computing," distributed storage, DNS request handling, provisioning, signal monitoring and reporting, content targeting, personalization, or business intelligence. A CDN may also enable an entity to operate or manage another's site infrastructure, in whole or in part.

Peer-to-Peer Network

A peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Wireless Network

A wireless network may couple client devices with a network. A wireless network may employ stand-alone ad-hoc networks, mesh networks, Wireless LAN (WLAN) networks, cellular networks, or the like.

A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Internet Protocol

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6.

The Internet refers to a decentralized global network of networks. The Internet includes LANs, WANs, wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

Network Architecture

Figure 5:
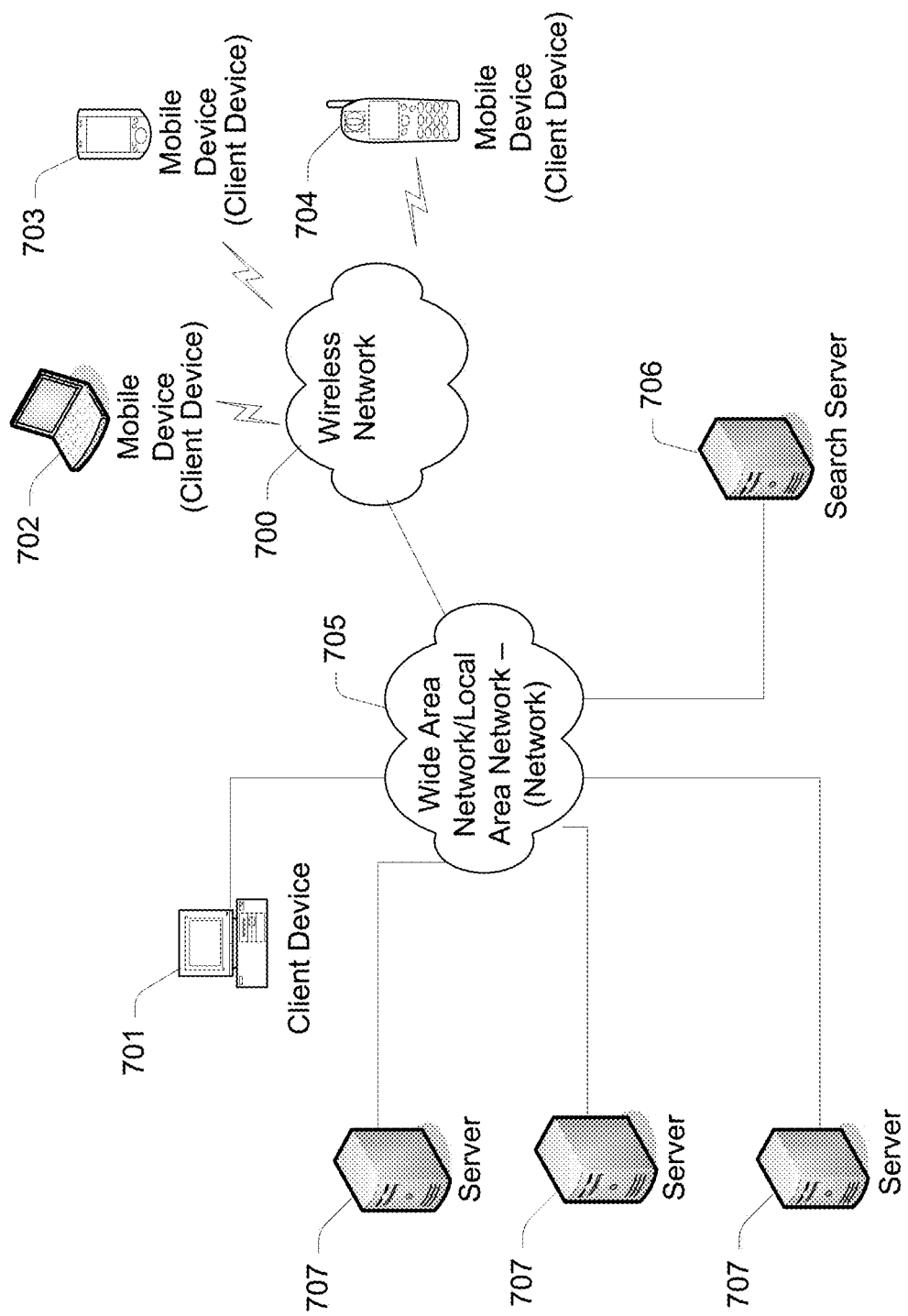
FIG. 5 is a schematic diagram illustrating an example embodiment of a network in which various embodiments may be implemented.

The disclosed embodiments may be implemented in any of a wide variety of computing contexts. FIG. 5 is a schematic diagram illustrating an example embodiment of a network. Other embodiments that may vary, for example, in terms of arrangement or in terms of type of components, are also intended to be included within claimed subject matter.

Implementations are contemplated in which users interact with a diverse network environment. As shown, FIG. 5, for example, includes a variety of networks, such as a LAN/WAN 705 and wireless network 700, a variety of devices, such as client devices 701-704, and a variety of servers such as content server(s) 707 and search server 706. The servers may also include an ad server (not shown). As shown in this example, the client devices 701-704 may include one or more mobile devices 702, 703, 704. Client device(s) 701-704 may be implemented, for example, via any type of computer (e.g., desktop, laptop, tablet, etc.), media computing platforms (e.g., cable and satellite set top boxes), handheld computing devices (e.g., PDAs), cell phones, or any other type of computing or communication platform.

The disclosed embodiments may be implemented in some centralized manner. This is represented in FIG. 5 by server(s) 707, which may correspond to multiple distributed devices and data store(s). The server(s) 707 and/or corresponding data store(s) may store user account data, user information, and/or content.

Server

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Content Server

A content server may comprise a device that includes a configuration to provide content via a network to another device. A content server may, for example, host a site, such as a social networking site, examples of which may include, without limitation, Flicker, Twitter, Facebook, LinkedIn, or a personal user site (such as a blog, vlog, online dating site, etc.). A content server may also host a variety of other sites, including, but not limited to business sites, educational sites, dictionary sites, encyclopedia sites, wikis, financial sites, government sites, etc.

A content server may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example.

Examples of devices that may operate as a content server include desktop computers, multiprocessor systems, microprocessor-type or programmable consumer electronics, etc.

Client Device

Figure 6:
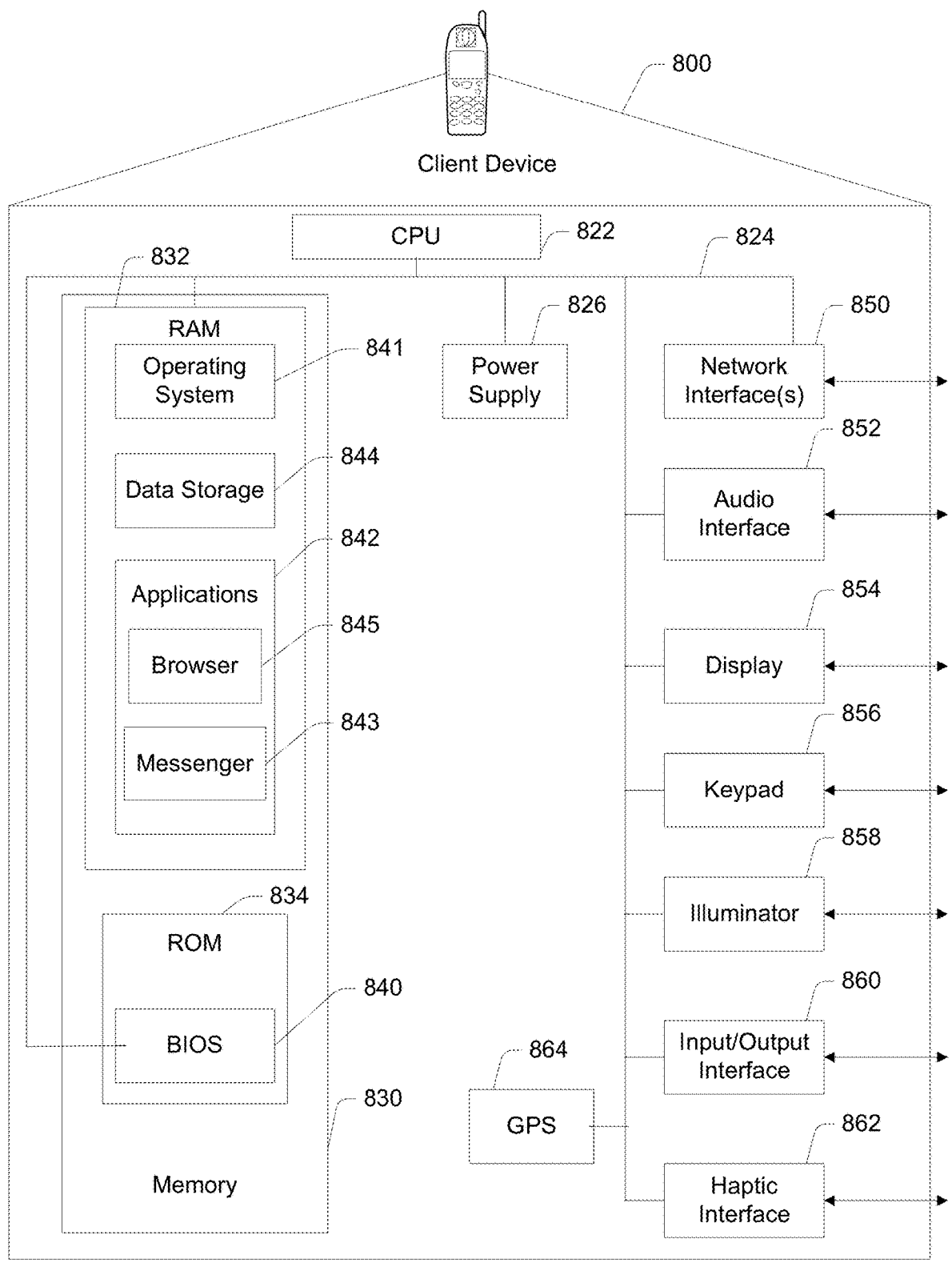
FIG. 6 is a schematic diagram illustrating an example client device in which various embodiments may be implemented.

FIG. 6 is a schematic diagram illustrating an example embodiment of a client device in which various embodiments may be implemented. A client device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like. A portable device may also be referred to as a mobile device or handheld device.

As shown in this example, a client device 800 may include one or more central processing units (CPUs) 822, which may be coupled via connection 824 to a power supply 826 and a memory 830. The memory 830 may include random access memory (RAM) 832 and read only memory (ROM) 834. The ROM 834 may include a basic input/output system (BIOS) 840.

The RAM 832 may include an operating system 841. More particularly, a client device may include or may execute a variety of operating systems, including a personal computer operating system, such as a Windows, iOS or Linux, or a mobile operating system, such as iOS, Android, or Windows Mobile, or the like. The client device 800 may also include or may execute a variety of possible applications 842 (shown in RAM 832), such as a client software application such as messenger 843, enabling communication with other devices, such as communicating one or more messages, such as via email, short message service (SMS), or multimedia message service (MMS), including via a network, such as a social network, including, for example, Facebook, LinkedIn, Twitter, Flickr, or Google, to provide only a few possible examples. The client device 800 may also include or execute an application to communicate content, such as, for example, textual content, multimedia content, or the like, which may be stored in data storage 844. A client device may also include or execute an application such as a browser 845 to perform a variety of possible tasks, such as browsing, searching, playing various forms of content, including locally stored or streamed video, or games (such as fantasy sports leagues).

The client device 800 may send or receive signals via one or more interface(s). As shown in this example, the client device 800 may include one or more network interfaces 850. The client device 800 may include an audio interface 852. In addition, the client device 800 may include a display 854 and an illuminator 858. The client device 800 may further include an Input/Output interface 860, as well as a Haptic Interface 862 supporting tactile feedback technology.

The client device 800 may transmit and detect patterns, images, or signals such as infra-red signals via the interface(s). Such patterns, images, or signals may uniquely identify a particular object (e.g., individual or item). For example, the client device 800 may transmit an infra-red blink pattern identifying a particular object, as well as detect an infra-red blink pattern.

The client device 800 may vary in terms of capabilities or features. Claimed subject matter is intended to cover a wide range of potential variations. For example, a cell phone may include a keypad such 856 such as a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) 864 or other location identifying type capability, or a display with a high degree of functionality, such as a touch-sensitive color 2D or 3D display, for example. The foregoing is provided to illustrate that claimed subject matter is intended to include a wide range of possible features or capabilities.

According to various embodiments, input may be obtained using a wide variety of techniques. For example, input for downloading or launching an application may be obtained via a graphical user interface from a user's interaction with a local application such as a mobile application on a mobile device, web site or web-based application or service and may be accomplished using any of a variety of well-known mechanisms for obtaining information from a user. However, it should be understood that such methods of obtaining input from a user are merely examples and that input may be obtained in many other ways.

Figure 7:
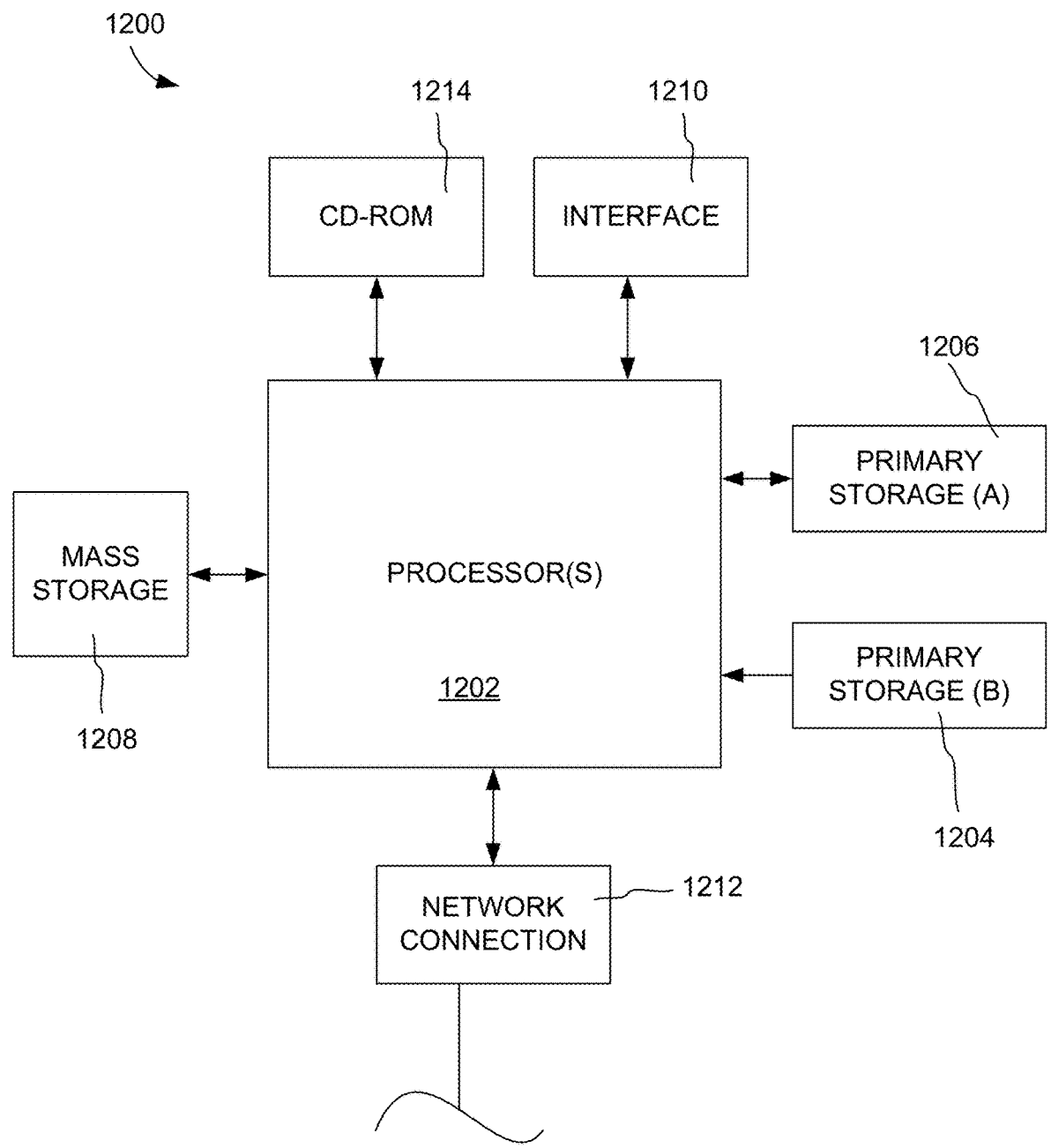
FIG. 7 is a schematic diagram illustrating an example computer system in which various embodiments may be implemented.

FIG. 7 illustrates a typical computer system that, when appropriately configured or designed, can serve as a system via which various embodiments may be implemented. The computer system 1200 includes any number of CPUs 1202 that are coupled to storage devices including primary storage 1206 (typically a RAM), primary storage 1204 (typically a ROM). CPU 1202 may be of various types including microcontrollers and microprocessors such as programmable devices (e.g., CPLDs and FPGAs) and unprogrammable devices such as gate array ASICs or general purpose microprocessors. As is well known in the art, primary storage 1204 acts to transfer data and instructions uni-directionally to the CPU and primary storage 1206 is used typically to transfer data and instructions in a bi-directional manner. Both of these primary storage devices may include any suitable computer-readable media such as those described above. A mass storage device 1208 is also coupled bi-directionally to CPU 1202 and provides additional data storage capacity and may include any of the computer-readable media described above. Mass storage device 1208 may be used to store programs, data and the like and is typically a secondary storage medium such as a hard disk. It will be appreciated that the information retained within the mass storage device 1208, may, in appropriate cases, be incorporated in standard fashion as part of primary storage 1206 as virtual memory. A specific mass storage device such as a CD-ROM 1214 may also pass data uni-directionally to the CPU.

CPU 1202 may also be coupled to an interface 1210 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1202 optionally may be coupled to an external device such as a database or a computer or telecommunications network using an external connection as shown generally at 1212. With such a connection, it is contemplated that the CPU might receive information from the network, or might output information to the network in the course of performing the method steps described herein.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store instructions for performing the disclosed methods, graphical user interfaces to be displayed in association with the disclosed methods, etc.

Because such information and program instructions may be employed to implement the systems/methods described herein, the disclosed embodiments relate to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as ROM and RAM. Examples of program instructions include both machine code, such as produced by a compiler, and files containing higher level code that may be executed by the computer using an interpreter.

Computer program instructions with which various embodiments are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques may be implemented in any suitable combination of software and/or hardware system, such as a web-based server or desktop computer system. Moreover, a system implementing various embodiments may be a portable device, such as a laptop or cell phone. An apparatus and/or web browser may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the disclosed method steps.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method, comprising:
    generating a user profile, for a user, based upon first information submitted by the user and second information deduced by a system based upon one or more user actions of the user, wherein the user profile comprises demographic information of the user, geographic information of the user, one or more interests of the user, and one or more properties of information accessed by the user;
    storing one or more user logs, comprising the user profile, in memory;
    receiving, by one or more servers, a search query including one or more terms from at least one client device, the search query defining a theme;
    executing, by the one or more servers and based upon the one or more user logs, the search query including the one or more terms to identify a plurality of search results pertaining to the theme;
    identifying, by the one or more servers, a plurality of tokens within the plurality of search results;
    identifying by the one or more servers, from the plurality of tokens, a plurality of topics pertaining to the theme, each one of the plurality of topics being associated with a corresponding set of one or more of tokens that is present in the plurality of tokens;
    ascertaining by the one or more servers, from a search log, search log data pertaining to the plurality of topics by searching in the search log, for each of the plurality of topics, the corresponding set of the plurality of tokens;
    determining a plurality of sub-topics based upon a first topic of the plurality of topics,
    wherein the determining the plurality of sub-topics comprises, based upon the first topic, performing a search for the plurality of sub-topics by:
        (i) executing, via a search application, a second search query associated with the first topic to identify a second plurality of search results associated with the first topic;
        (ii) parsing the second plurality of search results identified by executing the second search query associated with the first topic to obtain a second plurality of tokens;
        (iii) determining a first sub-topic of the plurality of sub-topics based upon a first token of the second plurality of tokens obtained by parsing the second plurality of search results; and
        (iv) determining a second sub-topic of the plurality of sub-topics based upon a second token of the second plurality of tokens obtained by parsing the second plurality of search results;
    ranking, by the one or more servers, the plurality of topics, comprising the first topic, and the plurality of sub-topics, comprising the first sub-topic and the second sub-topic, based upon the search log data;
    generating, by the one or more servers, an outline including a list including at least a portion of the plurality of topics, at least a portion of the plurality of sub-topics, one or more first search insights associated with the plurality of topics and one or more second search insights associated with the plurality of sub-topics according to the ranking;
    facilitating composition of an article, pertaining to the theme, based upon the outline, wherein the article comprises a first segment corresponding to the plurality of sub-topics, a second segment corresponding to a second topic of the plurality of topics and a third segment corresponding to a third topic of the plurality of topics; and
    providing by the one or more servers, for display at a client device, the article.

2. The method as recited in claim 1, wherein the one or more first search insights, in the outline used to facilitate composition of the article, comprise at least two of an indication of a number of times or a frequency that at least one topic of the plurality of topics has been searched via a search engine during a period of time, a change in the number of times or the frequency that the at least one topic has been searched via the search engine during the period of time relative to a previous period of time, a number of times or a frequency that search results that have been provided for the at least one topic have been clicked, a change in the number of times or the frequency that the search results that have been provided for the at least one topic have been clicked relative to the previous period of time, a number of advertisements presented in association with the at least one topic, or revenue generated from advertisements presented in association with the at least one topic.

3. The method as recited in claim 1, wherein the one or more first search insights, in the outline used to facilitate composition of the article, comprise an indication of a number of times or a frequency that at least one topic of the plurality of topics has been searched via a search engine during a period of time.

4. The method as recited in claim 1, wherein the one or more first search insights, in the outline used to facilitate composition of the article, comprise a change in a number of times or a frequency that at least one topic has been searched via a search engine during a period of time relative to a previous period of time.

5. The method as recited in claim 1, wherein the one or more first search insights, in the outline used to facilitate composition of the article, comprise a number of times or a frequency that search results that have been provided for at least one topic have been clicked.

6. The method as recited in claim 1, wherein the one or more first search insights, in the outline used to facilitate composition of the article, comprise a change in a number of times or a frequency that search results that have been provided for at least one topic have been clicked relative to a previous period of time.

7. The method as recited in claim 1, wherein the one or more first search insights, in the outline used to facilitate composition of the article, comprise a number of advertisements presented in association with at least one topic.

8. The method as recited in claim 1, wherein the one or more first search insights, in the outline used to facilitate composition of the article, comprise revenue generated from advertisements presented in association with at least one topic.

9. A non-transitory computer-readable storage medium storing thereon computer-readable instructions that when executed perform operations, the operations comprising:
  generating a user profile, for a user, based upon first information submitted by the user and second information deduced by a system based upon one or more user actions of the user, wherein the user profile comprises at least one of demographic information of the user, geographic information of the user, one or more interests of the user, or one or more properties of information accessed by the user;
  storing one or more user logs, comprising the user profile, in memory;
  obtaining, by one or more servers from at least one client device, a search query including one or more terms, the search query defining a theme;
  executing, by the one or more servers and based upon the one or more user logs, the search query including the one or more terms to identify a plurality of search results pertaining to the theme;
  identifying, by the one or more servers, a plurality of tokens within the plurality of search results;
  identifying by the one or more servers, from the plurality of tokens, a plurality of topics pertaining to the theme, each one of the plurality of topics being associated with a corresponding set of one or more of tokens that is present in the plurality of tokens;
  ascertaining by the one or more servers, from a search log, search log data pertaining to the plurality of topics by searching in the search log, for each of the plurality of topics, the corresponding set of the plurality of tokens;
  determining a plurality of sub-topics based upon a first topic of the plurality of topics,
  wherein the determining the plurality of sub-topics comprises, based upon the first topic, performing a search for the plurality of sub-topics by:
    (i) executing, via a search application, a second search query associated with the first topic to identify a second plurality of search results associated with the first topic;
    (ii) parsing the second plurality of search results identified by executing the second search query associated with the first topic to obtain a second plurality of tokens;
    (iii) determining a first sub-topic of the plurality of sub-topics based upon a first token of the second plurality of tokens obtained by parsing the second plurality of search results; and
    (iv) determining a second sub-topic of the plurality of sub-topics based upon a second token of the second plurality of tokens obtained by parsing the second plurality of search results;
  ranking, by the one or more servers, the plurality of topics, comprising the first topic, and the plurality of sub-topics, comprising the first sub-topic and the second sub-topic, based upon the search log data;
  generating, by the one or more servers, an outline including a list including at least a portion of the plurality of topics, at least a portion of the plurality of sub-topics, one or more first search insights associated with the plurality of topics and one or more second search insights associated with the plurality of sub-topics according to the ranking;
  providing, by the one or more servers, the outline for use in composing articles pertaining to the theme; and
  providing by the one or more servers, for display at a client device, an article generated based upon the outline, at least a subset of the portion of the plurality of topics in the outline being addressed in the article, wherein the article pertains to the theme and includes one or more links, the one or more links being associated with one or more of the portion of the plurality of topics.

10. The non-transitory computer-readable storage medium as recited in claim 9, the operations comprising:
  parsing at least a portion of the plurality of search results to obtain the plurality of tokens, each token in the plurality of tokens being present in at least one of the plurality of search results.

11. The non-transitory computer-readable storage medium as recited in claim 9, the operations comprising:
  providing a search results page pertaining to a corresponding topic of the at least a portion of the plurality of topics in response to a selection of a first link of the one or more links;
  wherein the search results page comprises a segment including a set of links, each link of the set of links being associated with a corresponding topic of the at least a portion of the plurality of topics.

12. The non-transitory computer-readable storage medium as recited in claim 11, the operations comprising:
  providing, in response to a selection of a second link of the set of links, a subsequent search results page pertaining to the corresponding topic of the at least a portion of the plurality of topics, wherein the subsequent search results page includes the segment including the set of links.

13. The non-transitory computer-readable storage medium as recited in claim 9, wherein the search log data pertains to a period of time, wherein the search log data for each topic in the plurality of topics indicates at least one of a number of times or frequency that the topic has been searched via a search engine during the period of time, a change in the number of times or frequency that the topic has been searched via the search engine during the period of time relative to a previous period of time, or a change in the number of times or frequency that search results that have been provided for the topic have been clicked relative to the previous period of time.

14. A system comprising a processor and non-transient memory with program logic for execution on the processor, the program logic configurable to cause:
    obtaining, by one or more servers, a search query received from at least one client device, the search query including one or more terms, the search query defining a theme;
    executing, by the one or more servers, the search query including the one or more terms to identify a plurality of search results pertaining to the theme;
    identifying, by the one or more servers, a plurality of tokens within the plurality of search results;
    identifying by the one or more servers, from the plurality of tokens, a plurality of topics pertaining to the theme, each one of the plurality of topics being associated with a corresponding set of one or more of tokens that is present in the plurality of tokens;
    ascertaining by the one or more servers, from a search log, search log data pertaining to the plurality of topics by searching in the search log, for each of the plurality of topics, the corresponding set of the plurality of tokens;
    determining a plurality of sub-topics based upon a first topic of the plurality of topics,
    wherein the determining the plurality of sub-topics comprises, based upon the first topic, performing a search for the plurality of sub-topics by:
      (i) executing a second search query associated with the first topic to identify a second plurality of search results associated with the first topic;
      (ii) parsing the second plurality of search results identified by executing the second search query associated with the first topic to obtain a second plurality of tokens;
      (iii) determining a first sub-topic of the plurality of sub-topics based upon a first token of the second plurality of tokens obtained by parsing the second plurality of search results; and
      (iv) determining a second sub-topic of the plurality of sub-topics based upon a second token of the second plurality of tokens obtained by parsing the second plurality of search results;
    ranking, by the one or more servers, the plurality of topics, comprising the first topic, and the plurality of sub-topics, comprising the first sub-topic and the second sub-topic, based upon the search log data;
    generating, by the one or more servers, an outline including a list including at least a portion of the plurality of topics, at least a portion of the plurality of sub-topics, one or more first search insights associated with the plurality of topics and one or more second search insights associated with the plurality of sub-topics according to the ranking;
    providing, by the one or more servers, the outline for use in composing articles pertaining to the theme; and
    providing by the one or more servers, for display at a client device, an article generated based upon the outline, at least a subset of the portion of the plurality of topics in the outline being addressed in the article, wherein the article pertains to the theme and includes one or more links, the one or more links being associated with one or more of the portion of the plurality of topics.

15. The system as recited in claim 14, wherein the search log data pertains to a period of time, wherein the search log data for each topic in the plurality of topics indicates at least one of a number of times or frequency that the topic has been searched via a search engine during the period of time, a change in the number of times or frequency that the topic has been searched via the search engine during the period of time relative to a previous period of time, or a change in the number of times or frequency that search results that have been provided for the topic have been clicked relative to the previous period of time.

16. The system as recited in claim 14, the program logic further configurable to cause:
    in response to a selection of a first link of the one or more links, providing a search results page pertaining to a corresponding topic of the at least a portion of the plurality of topics;
    wherein the search results page comprises a segment including a set of links, each link of the set of links being associated with a corresponding topic of the at least a portion of the plurality of topics.

17. The system as recited in claim 16, the program logic further configurable to cause:
    in response to a selection of a second link of the set of links, provide a subsequent search results page pertaining to the corresponding topic of the at least a portion of the plurality of topics, wherein the subsequent search results page includes the segment including the set of links.

18. The system as recited in claim 14, wherein the one or more first search insights, in the outline used to facilitate composition of the article, comprise an indication of a number of times or a frequency that at least one topic of the plurality of topics has been searched via a search engine during a period of time, a number of advertisements presented in association with at least one topic and revenue generated from advertisements presented in association with at least one topic.

* * * * *